United States Patent [19]

Cutler, Jr. et al.

[11] Patent Number: 5,572,512

[45] Date of Patent: Nov. 5, 1996

[54] DATA ROUTING METHOD AND APPARATUS FOR COMMUNICATION SYSTEMS HAVING MULTIPLE NODES

[75] Inventors: Victor H. Cutler, Jr., Mesa; Henry J. Happ, III, Gilbert, both of Ariz.

[73] Assignee: Motorola, Inc., Schaumburg, Ill.

[21] Appl. No.: 498,213

[22] Filed: Jul. 5, 1995

[51] Int. Cl.[6] ...................................................... H04J 3/24
[52] U.S. Cl. .................. 370/13; 370/54; 370/60; 370/94.1; 340/826
[58] Field of Search .................. 370/13, 16, 54, 370/60, 94.1, 94.3; 340/825.03, 826, 827; 379/219, 220, 221, 271, 272, 273

[56] References Cited

U.S. PATENT DOCUMENTS

| | | | |
|---|---|---|---|
| 4,875,208 | 10/1989 | Furuhashi et al. | 370/94.1 |
| 4,939,726 | 7/1990 | Flammer et al. | 370/94.1 |
| 4,974,224 | 11/1990 | Boone | 370/94.1 |
| 5,115,433 | 5/1992 | Baran et al. | 370/94.3 |
| 5,128,926 | 7/1992 | Perlman et al. | 370/54 |
| 5,467,345 | 11/1995 | Cutler, Jr. et al. | 370/60 |

*Primary Examiner*—Alpus H. Hsu
*Attorney, Agent, or Firm*—Sherry J. Whitney

[57] ABSTRACT

A method and apparatus for balancing data packet routing through a communication system (10) and for routing data packets based on their type is accomplished by using multiple routing table pages (152, 154) and page maps (180, 190) stored in nodes (100–112). For a given data packet type, a first page map (180) is used to select a routing table page (152, 154) so that only certain types of data may be routed through a target node (100). In a test mode, a neighboring node (102–112) will be configured such that it can route test data packets through the target node (100) while not routing other types of data packets through the target node (100). For a given routing number, a second page map (190) is used to select a routing table page (152, 154) so that traffic loads are balanced throughout the system (10).

20 Claims, 5 Drawing Sheets

| PACKET TYPE (182) | PAGE (184) |
|---|---|
| TEST | 5 |
| NETWORK OPERATIONS | 6 |
| TELEMETRY | 7 |
| ⋮ | ⋮ |

180

| ROUTING NUMBER (192) | PAGE (194) |
|---|---|
| 000 | 1 |
| 001 | 2 |
| 010 | 3 |
| 011 | 4 |
| 100 | 1 |
| 101 | 2 |
| 110 | 3 |
| 111 | 4 |

190

DATA ROUTING METHOD AND APPARATUS FOR COMMUNICATION SYSTEMS HAVING MULTIPLE NODES

FIELD OF THE INVENTION

The present invention relates generally to routing communication data through a communications network and, more particularly, to modifying routing based on the type of data being routed or the state of a communication node.

BACKGROUND OF THE INVENTION

Communication systems having multiple nodes transmit and receive data over communication links. In many systems, a communication node is capable of communicating with multiple other nodes. Nodes that communicate directly with each other over a communication link are referred to herein as "neighboring nodes".

Commonly, a data packet intended to be transmitted from a source terminal to a destination terminal is routed through the system using routing tables stored in each node. A communication node identifies the destination of the data packet and determines, using the routing tables, to which neighboring node the data packet should be sent so that the packet may ultimately reach its destination.

A system which has many nodes may wish to balance the traffic loads over all available links when multiple possible routes exist between a source and a destination of a data packet. Prior art routing table configurations do not provide an inherent ability to balance loads by distributing data packets among the multiple possible routes.

A data packet may contain different types of data (e.g., information, test, telemetry, system operations data). Although the data packets may need to be routed differently based on their packet type, prior art systems cannot perform discretionary routing using only the current routing table configurations. An example of the inability of prior art systems simply to differentially handle different types of data packets occurs when a new node is brought into the system.

When a new node is brought into the communication system, neighboring nodes must alter their routing strategy to recognize the new node. Prior art methods require the neighboring nodes to load new tables that recognize the new node. Generating and loading new routing tables is time consuming, and synchronizing usage of the new tables is difficult. Loading time and synchronization problems increase as the number of neighboring nodes increases. Additionally, routing tables often are of considerable size, and sending new routing tables to each neighboring node uses a significant quantity of valuable system bandwidth which could better be utilized for revenue-producing data.

Nodes being added to a system should be tested before they are used to support all types of data. Additionally, a system may occasionally test a pre-existing node to verify that it is operating according to system specifications. A problem with prior art systems is that they do not embody simple methods of testing a new or pre-existing node (referred to herein as a "node-under-test") and then synchronizing neighboring nodes' recognition of the node's full operational status. To test a node, prior art methods interrupt system operations to route test data packets through the node-under-test using a set of routing tables designed for test data only. After testing is completed, new routing tables must be loaded into neighboring nodes, resulting in several of the problems discussed above.

Other prior art methods may have different routing tables: some tables used for test data and other tables used for other types of data. Because routing tables often use large blocks of memory, multiple routing tables are undesirable because they increase the quantity of memory a node requires. Prior art systems also have the same synchronization problems in transitioning from a testing phase of operation to full operations.

Besides adding and testing a new or pre-existing node, a node may be purposefully withdrawn from the system, or may become incapable of operating because of a failure, for example. Similar to adding a new node to the system, prior art methods may load new tables into the neighboring nodes so that the neighboring nodes will not route data to the withdrawn node. However, table generation and loading is time consuming. Additionally, by using prior art methods, data may be lost during table generation and loading because neighboring nodes may continue to route data to a failed node as if it were still capable of operating.

What are needed are a method and apparatus to balance traffic loads among the multiple possible routes using a single routing table. Further needed are a method and apparatus to differentially route a data packet based on its type. Further needed are a method and apparatus to synchronize routing among neighboring nodes during insertion, test, or removal of a communication node without disruption to the communication system. Further needed are a method and apparatus to synchronize routing modifications for multiple nodes in a timely manner and without using a significant amount of system bandwidth.

DETAILED DESCRIPTION OF THE DRAWINGS

Provided herein are a method and apparatus to balance traffic loads among multiple possible routes, and to differentially route a data packet based on its type using a single routing table. Further provided are a method and apparatus to synchronize routing among neighboring nodes during insertion, test, and removal of a communication node without disrupting the communication system. Further provided are a method and apparatus to synchronize routing modifications for multiple nodes in a timely manner without using a significant amount of revenue-bearing system bandwidth.

Figure 1:
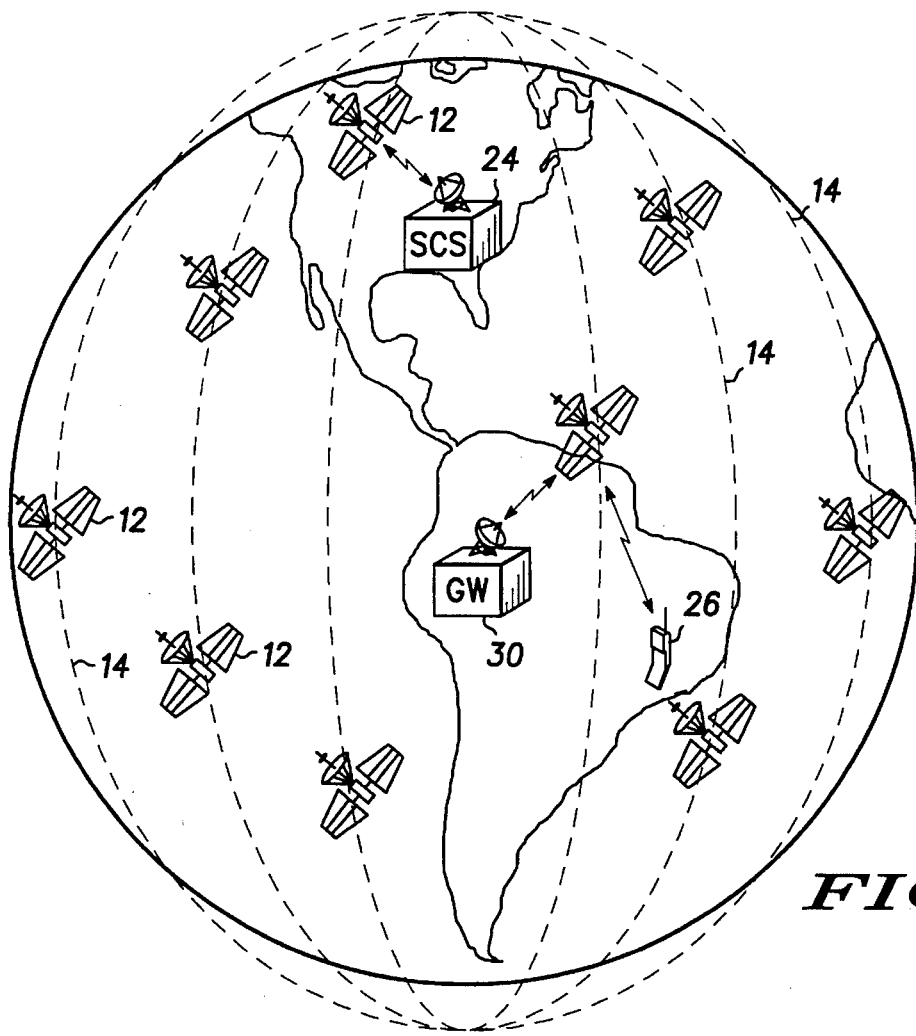
FIG. 1 illustrates a multi-nodal communication system in accordance with a preferred embodiment of the present invention.

FIG. 1 illustrates a multi-nodal communication system 10 in accordance with a preferred embodiment of the present invention. Although the preferred embodiment of the present invention is described as a satellite communication network having radio frequency (RF) communication links, the method and apparatus of the present invention may be utilized in a ground-based communication system as would be obvious to one of skill in the art based on the description. Additionally, communication links between system nodes may utilize any type of data transmissions (e.g., electrical, radio, or optical transmissions).

Communication system 10 is dispersed over, and surrounds the earth through the use of orbiting satellites 12. Satellites 12 occupy orbits 14 that may be low-earth orbits, medium-earth orbits, geosynchronous orbits, or a combination thereof. Low-earth orbits occur generally at an altitude of approximately 600 km to 2000 km, medium-earth orbits occur at approximately 2000 km to 20,000 km, and geosynchronous orbits occur at approximately 42,165 km, but other altitudes may also be used. In the example shown, communications system 10 uses six polar orbital planes, with each orbital plane holding eleven satellites 12 for a total of sixty-six satellites 12. However, sixty-six satellites 12 are not essential, and more or fewer satellites 12, or more or fewer orbital planes, or combinations of orbiting and geosynchronous satellites, may be used. For clarity, FIG. 1 illustrates only a few of satellites 12.

Satellites 12 operate as routing nodes for communication system 10, and communicate with terrestrial equipment which may be any number of radio communication Subscriber Units 26, Gateways 30, System Control Station 24, and possibly other communication devices (not shown). Satellites 12 also communicate with other satellites 12 over "cross links" (e.g., cross links 114–120, FIG. 3).

Each satellite 12 desirably has at least one resident routing table which the satellite 12 updates using information received from System Control Station 24. Functionality of satellites 12 is described in detail in conjunction with FIGS. 7–9.

A Subscriber Unit 26 (SU) may be, for example, a hand-held, portable cellular telephone adapted to transmit data to and/or receive data from satellites 12. An SU 26 may also be a facsimile device, pager, data terminal or any other type of communication device. Hard-wired telephony units (not shown) may also serve as communication terminals in communication system 10. These telephony units may communicate with the satellite network using intermediate Gateways 30.

SUs 26 and telephony units generate data, referred to herein as "mission data", which consume system resources (e.g., communication channels). In a commercial application, SU users are desirably charged a user's fee that is proportional to the amount of resources consumed and other factors. Thus, mission data is desirably revenue-producing data. For this reason, lucrative operation of communication system 10 prefers as much system bandwidth as possible to be allocated to mission data.

A Gateway 30 (GW) is an equipment facility, typically ground-based, that is capable of interfacing satellites 12 with ground-based equipment such as, for example, a public switched telephone network (PSTN) (not shown). GW 30 may communicate directly with satellites 12, or may communicate via remote or co-located ground stations (not shown).

A System Control Station 24 (SCS) is a control facility, typically groundbased, which controls some operations of communication system 10. SCS 24 may communicate directly with satellites 12, or may communicate via remote or co-located ground stations (not shown).

In a preferred embodiment, SCS 24 creates routing table update commands (RTUCs) and sends them to satellites 12. Satellites 12 use the RTUCs to modify their resident routing tables. SCS 24 also desirably receives telemetry information from satellites 12 (e.g., notification of a failed link, power availability) and creates and sends new RTUCs to accommodate system changes, when necessary. In an alternate embodiment, SCS 24 may send entire routing tables to satellites 12 to accommodate system changes, rather than sending RTUCs which are used to modify existing routing tables. Functionality of SCS 24 in a preferred embodiment is described in detail in conjunction with FIGS. 7 and 9.

Only one of SCS 24, GW 30, and S U 26 are shown in FIG. 1 for clarity and ease of understanding. Those of skill in the art will understand based on the description that additional system facilities may be desirable, depending upon the requirements of the communication system.

Figures 2, 4:
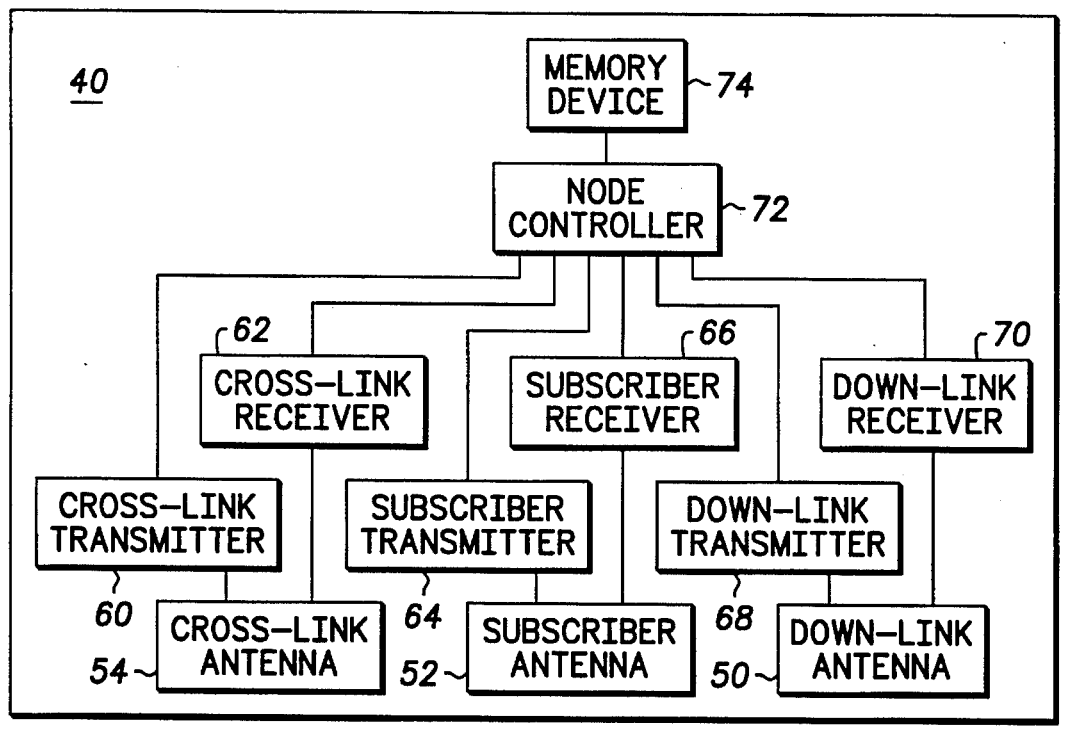
FIG. 2 illustrates a communication node in accordance with a preferred embodiment of the present invention.
FIG. 4 illustrates an exemplary routing table configuration in accordance with a preferred embodiment of the present invention.

FIG. 2 illustrates a communication node 40 in accordance with a preferred embodiment of the present invention. Communication node 40 may be, for example, a satellite 12 as shown in FIG. 1. However, it would be obvious to one of skill in the art based on the description that other communication devices (e.g., ground-based routing devices) using other modes of data transmission (e.g., optical or electrical transmissions) may also be employed as a communication node.

Node 40 desirably includes one or more cross-link antennas 54, down-link antennas 50, and subscriber antennas 52. Although only one each of cross link antenna 54, down-link antenna 50, and subscriber antenna 52 are shown in FIG. 2, more than one of any of them may reside on-board node 40, as would be obvious to one of skill in the art based on the description. It would be obvious to one of skill in the art based on the description that if the node is a device other than a satellite, the links supported by antennas 50, 52, 54 could instead be hard-wired or optical links, for example. Accordingly, the hardware used to support those links would be appropriate for the transmission method.

Cross-link antenna 54 is coupled to cross-link transmitter 60 and cross-link receiver 62, and is desirably used to communicate with neighboring nodes (not shown). In a preferred embodiment, node 40 has a cross-link antenna 54 for each neighboring node with which node 40 communicates. Thus, for example, if node 40 communicates with four neighboring nodes, at least four cross-link antennas 54 would exist on-board node 40. A "cross-link port" is defined herein as the communication equipment (e.g., cross-link antenna 54, cross-link transmitter 60, cross-link receiver 62, and processor (not shown)) used to communicate with a particular neighboring node. In the above example, where four neighboring nodes exist, at least four ports would exist on-board node 40. The functionality of crosslink ports are described in more detail in conjunction with FIG. 3.

Subscriber antenna 52 is coupled to subscriber transmitter 64 and subscriber receiver 66, and is desirably used to communicate with SUs 26 (FIG. 1). In a commercial system, revenue-bearing SU mission data is transmitted and received using subscriber antenna 52. In a preferred embodiment, subscriber antenna 52 is a cellular antenna which provides for communication with multiple SUs 26 (FIG. 1).

Down-link antenna 50 is coupled to down-link transmitter 68 and down-link receiver 70, and is desirably used to communicate with SCS 24 (FIG. 1) and/or GW 30 (FIG. 1). Desirably, telemetry, update commands, and other system operations data are transmitted and received using down-link antenna 50.

In a preferred embodiment, transmitters 60, 64, 68 and receivers 62, 66, 70 are all coupled to node controller 72, which is, in turn, coupled to memory device 74. In an alternate embodiment, multiple controllers and memory devices (not shown) may exist on-board node 40, each providing a distributed-controller function. However, for ease of description, only one node controller 72 is shown, and portions of the method of the present invention that pertain to a node 40 are described as being executed by the single node controller 72. It would be obvious to one of skill in the art based on the description, however, that portions of the method of the present invention that pertain to a node 40 may be carried out by distributed controllers (not shown).

Node 40 also desirably includes an energy-generating device (not shown) to provide energy to the equipment on-board node 40. For example, if node 40 is a satellite, an energy-generating device may consist of solar panels coupled to batteries. It would be obvious to one of skill in the art based on the description that if a system node were not a satellite, an energy supply may be provided by other energy-generating equipment.

Node controller 72 controls real-time operation of node 40, including data routing functions and other operations of cross-link antenna 54, subscriber antenna 52 and down-link antenna 50. Node controller 72 controls routing by accessing one or more routing tables which are desirably stored in memory device 74. A routing table indicates to which neighboring node (i.e., to which port) the node 40 should route a data packet based on the destination of the data packet. One central routing table may be stored in memory device 74, or separate "port routing tables" may be stored at each port. For ease of description, the method embodying the present invention is described as if the one or more routing tables are accessible by node controller 72. Routing tables are described in detail in conjunction with FIG. 4.

Figure 3:
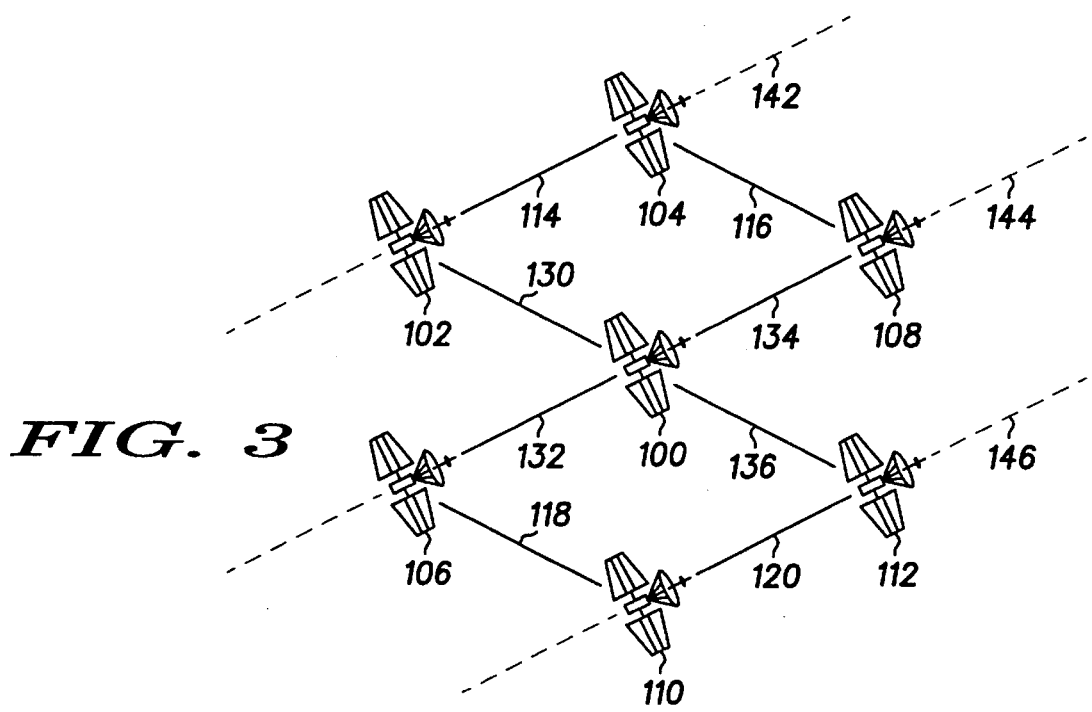
FIG. 3 illustrates multiple nodes and communication links between the nodes in accordance with a preferred embodiment of the present invention.

FIG. 3 illustrates multiple nodes 100–112 and cross-links 114–136 between nodes 100–112 in accordance with a preferred embodiment of the present invention. In a preferred embodiment, nodes 100–112 are satellites (e.g., satellite 12, FIG. 1) which travel in orbital paths 142–146. Nodes 100–112 send data packets to each other over cross-links 114–136. In a preferred embodiment, links 114–136 are bi-directional RF links. However, it would be obvious to one of skill in the art based on the description that other types of transmission links may also be used (e.g., optical or electrical links).

As shown in FIG. 3, orbital paths 142–146 are in the same direction as each other. However, orbital paths 142–146 may be in different directions. Nodes 106, 100, and 108 are shown to travel in the same orbital path 144. As illustrated, satellite 100 follows satellite 108 in orbital path 144. With respect to satellite 100, satellite 108 is in the "fore" direction, satellite 106 is "aft", satellite 102 is "left", and satellite 112 is "right" (abbreviated herein as "F", "A", "L", and "R", respectively). A node such as satellite 100 may send and receive data over the left 130, fight 136, fore 134, or aft 132 communication links. Although a preferred embodiment shows a satellite 100 communicating with four neighboring satellites 102, 106, 108, 112, it would be obvious to one of skill in the art based on the description that satellite 100 may communicate with more or fewer neighboring satellites.

FIG. 4 illustrates an exemplary routing table configuration in accordance with a preferred embodiment of the present invention. As described above, resident within each satellite is at least one routing table 150, which instructs the node as to which communication link to send data packets over.

In order to distribute data packets throughout the system, a routing table 150 may have multiple alternative "pages" 152, 154 of routing instructions. Using multiple routing pages accomplishes at least two major advantages and is essential to the present invention.

First, multiple routing pages allow the system to more efficiently balance the traffic load that it encounters, thus increasing system capacity. Assume, for purposes of explanation, that any one of four possible "pipes" may be selected to send a data packet from point A (the source) to point B (the destination), where a "pipe" is a sequence of nodes through which the data packet may be routed. Each of the four pipes may have one or more common nodes along its routing path. For example, assume that a node is a common node along two different pipes. Transmission of the data packet through pipe 1 requires that the data packet be sent left, and pipe 2 requires that the data packet be sent aft.

Multiple routing pages am used such that each page corresponds to a different pipe. Using the example above, a page that corresponds to pipe 1 will indicate to the node that the data packet should be routed left, and a page that corresponds to pipe 2 will indicate that the data packet should be routed aft.

As used herein, a Destination Node Identifier ("DN-ID") or "destination identifier" is desirably assigned to each possible destination device of a data packet. For example, each satellite 12 and ground station of the system of FIG. 1 may have a unique DN-ID associated therewith. The number of DN-IDs depends on the number of devices considered destinations within a particular system.

Each data packet desirably contains a DN-ID field which contains a "packet destination variable". Although the data packet's DN-ID field indicates the ultimate destination of the data packet, it does not overtly differentiate between which pipe (or page) is used. Therefore, each data packet contains another variable, referred to herein as the routing number (RN). The RN indicates which pipe the data packet is to be sent through, and, thus, which page is to be used to send the data packet. This concept is discussed in detail below.

A second advantage to using multiple routing pages is that multiple pages allow a node to route a data packet according to its payload, or "packet type". Data packets may contain mission data, system operations data, test data, or telemetry information, for example. Some routing paths may be off limits to certain types of data packets. Thus, for a certain data, packet type, the node may be precluded from using a particular routing page. This concept is discussed in detail below.

A node receiving a data packet correlates the packet destination variable in the DN-ID field with the DN-ID column of the node's routing table. The routing table indicates over which link (i.e., in which direction: fore, aft, left, or right) the node should send the data packet.

As shown in FIG. 4, a first page 152 of a routing table 150 is shown having a DN-ID column 160 and a routing direction column 162. Other columns (not shown) may be present in a routing table 150 to provide other information that may be relevant to the routing decision. Inclusion of other columns in the routing table 150 does not affect the applicability of the present invention. When a data packet is received, the DN-ID in the data packet is correlated with the DN-ID column 160, and the direction in which to route the data packet is determined as the corresponding entry in the direction column 162. For example, a data packet with a DN-ID of "3" would be routed to the right ("R") neighboring satellite as indicated in FIG. 4.

FIG. 4 also illustrates a second page 154 of a routing table 150. The second page 154 also has a DN-ID column 164 and a routing direction column 166. Generally, the differences between the second page 154 and the first page 152 are the entries in the routing direction columns 166, 162, although all entries may not be different. The entries may be the same when a neighboring node is common to more than one routing path (i.e. pipe).

Although only two pages 152, 154 are shown in FIG. 4 for ease of explanation, any number of pages may be used as would be obvious to one of skill in the art based on the description. In a preferred embodiment, eight pages are used to provide alternative routing for a particular DN-ID. The pages are desirably stored in a memory device (e.g., memory device 74, FIG. 2) that is accessible by the one or more processors (e.g., node controller 72, FIG. 2) on-board a node. Storage of the multiple pages of a routing table may be contiguous or non-contiguous. Additionally, the multiple pages may be separated in memory, or may be interleaved. Any way of accessing the multiple pages may be used as would be obvious to one of skill in the art based on the description.

In a preferred embodiment, a node decides which of the routing table's multiple pages the node will use for a particular data packet based on any of several criteria, or a combination of criterion. For example, the type of data packet (e.g., test, telemetry, network operations, and mission data) may be one decision criteria. As used herein, "test data" describes a data packet that is used to test the functionality of a node. "Telemetry" is used herein to indicate a data packet that contains information as to the health and status of a node. Finally, "network operations" data refers to a data packet that contains information necessary for the operation of the communication system. More, fewer, or different data types may be used by the communication system, as would be obvious to one of skill in the art based on the description.

As described above, each data packet contains a DN-ID which the node correlates to its routing table to determine in which direction to route the data packet. Other fields in the data packet, besides the DN-D field, may contain values that allow the node to determine which particular routing page to use. The determination of which routing page to use may be made before or after using the DN-ID to determine in which direction to route the data packet. In a preferred embodiment, the routing page is determined before using the DN-ID.

In a preferred embodiment, each data packet contains a "packet type" (PT) and a "routing number" (RN) for the purpose of determining which of the routing table's pages to use. The PT and RN may exist within the same field in the data packet, or may exist in separate fields. The PT is correlated with a "PT-to-page" map (FIG. 5) which is accessible to the node. Using the PT accomplishes the advantage of using multiple pages to route according to packet type. Similarly, the RN is correlated with an "RN-to-page" map (FIG. 6) which is accessible to the node. Using the RN accomplishes the advantage of using multiple pages to distribute loading through the communication system. Utilization of a data packet's PT and RN in determining which page to use is described in detail in conjunction with FIGS. 5–9.

Figures 5, 6, 7:
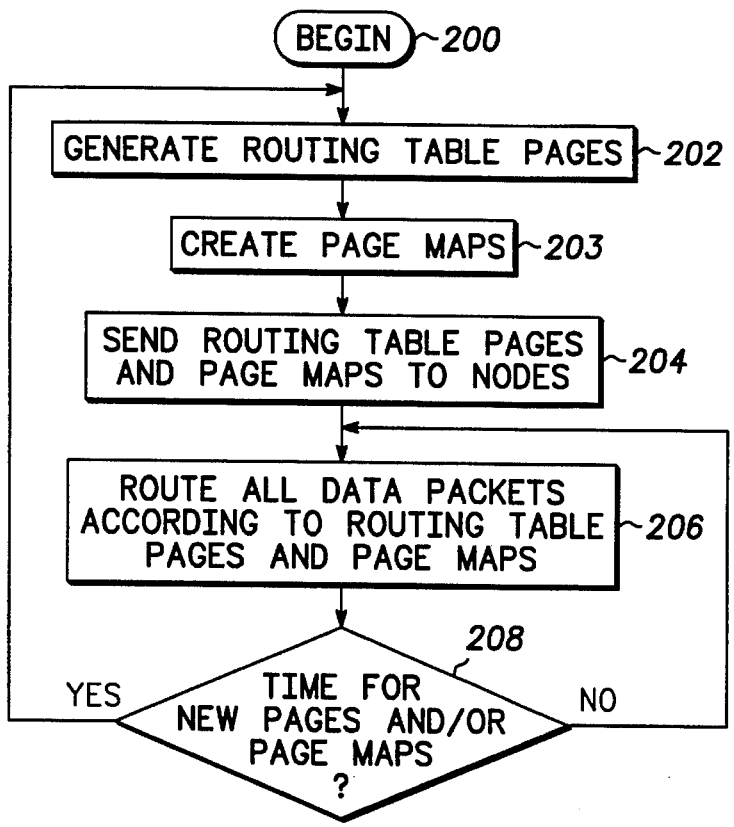
FIG. 5 illustrates an exemplary packet-type-to-page map in accordance with a preferred embodiment of the present invention.
FIG. 6 illustrates an exemplary routing-number-to-page map in accordance with a preferred embodiment of the present invention.
FIG. 7 illustrates a method for a communication system to control communications with a selected node in accordance with a preferred embodiment of the present invention.

FIG. 5 illustrates an exemplary PT-to-page map 180 in accordance with a preferred embodiment of the present invention. The PT-to-page map 180 is a data structure that is accessible to the node, and is desirably resident in a memory device (e.g., memory device 74, FIG. 2) on-board the node. The PT-to-page map 180 contains a PT column 182 and a page column 184. The PT column 182 desirably has an entry for each type of data packet that the node may encounter during its operations. For exemplary purposes, FIG. 5 shows "test", "network operations", and "telemetry" packet types in PT column 182. These packet types are used to illustrate the advantages of embodiments of the present invention, and are not intended to limit the scope of the invention. As would be obvious to one of skill in the an, more, fewer, or different packet:types may be included in a PT-to-page map 180. The page column 184 indicates which page of the routing table (e.g., routing table 150, FIG. 4) should be used for a particular packet type. Page numbers indicated in the page column 184 are for illustrative purposes only. Use of a PT-to-page map 180 during a routing decision in accordance with a preferred embodiment of the present invention is described in detail in conjunction with FIG. 8.

FIG. 6 illustrates an exemplary RN-to-page map 190 in accordance with a preferred embodiment of the present invention. The RN-to-page map 190 is a data structure that is accessible to the node, and is desirably resident in a memory device (e.g., memory device 74, FIG. 2) on-board the node. The RN-to-page map 190 is shown to have an RN column 192 and a page column 194. As described above, each data packet has an RN. The RN may be a value that is either arbitrary or non-arbitrary as far as routing is concerned. For example, an RN may be selected non-arbitrarily to ensure that them is balanced routing of the data packets through the system.

The data packet's RN is correlated with the RN column 192 to determine which page of the routing table should be used for the particular data packet. The page to be used is indicated in the page column 194. Page numbers shown in the page column 194 are for illustrative purposes only. Also for illustrative purposes, FIG. 6 shows eight binary values in the RN column 192. In a preferred embodiment, the range of RN values corresponds to the number of pages in a routing table. Thus, in the example given, if binary 000 through 111 represents the range of RN values, then eight routing pages exist in a routing table. However, more or lower values may be used as would be obvious to one of skill in the art based on the description. It is not required that there be a one-to-one correlation between the number of routing table pages and the number of RN values. Use of an RN-to-page map 190 in a routing decision made in accordance with a preferred embodiment of the present invention is described in detail in conjunction with FIG. 8.

FIG. 7 illustrates a method for a communication system to control communications with a target node in accordance with a preferred embodiment of the present invention. The method begins in step 200 with step 202 of generating routing tables. Step 202 is desirably performed by an SCS 24 (FIG. 1) and includes the step of generating "routing table update commands" (RTUC) for at least one node. It would be obvious to one of skill in the art based on the description that other facilities may generate RTUCs, such as, for example, satellites 12 (FIG. 1), or GW 30 (FIG. 1). RTUCs may be generated on a periodic or a periodic basis. Each RTUC contains information necessary for a particular node to update one or more entries of a node's routing table.

Using RTUCs to update routing tables, rather than sending whole new routing tables, provides an efficient mode of updating a routing table because, in general, not every entry in a routing table will change from one update to the next. RTUCs eliminate the time and resource-consuming necessity of sending an entire new routing table to the node when as little as one routing table entry needs to be modified. However, generation of RTUCs is not a necessity of the present invention. Thus, in an alternate embodiment, an entire routing table may be generated, and the entire routing table may be sent to a node instead of sending RTUCs.

In a preferred embodiment, each RTUC has an associated "update time". The update time indicates the time when a new routing table entry (or entries) associated with the RTUC should replace an old routing table entry in the routing table. The new routing table entry is contained within the RTUC. In an alternate embodiment, each RTUC may be used to modify the routing tables upon receipt by the node.

As stated above, each RTUC contains information which indicates a change to be made to a routing table entry. The information in the RTUC is derived by the SCS 24 (FIG. 1) based on one or more changes in the state of the system. For example, a routing table entry may be valid when a satellite 12 (FIG. 1) is located within a particular latitude range. However, the entry may need to be changed when the satellite 12 (FIG. 1) enters a different latitude range because of the difference in the physical relationship of neighboring satellites with respect to the satellite 12. To generate an RTUC that would adapt the satellite's routing table to accommodate the new configuration of the satellites, the SCS 24 (FIG. 1) would be required to predict the future locations of the satellites, determine the time that the satellites would be in the new configuration, and determine what routing would be appropriate at that time. These determinations would involve calculations that are not important to the present invention.

Future satellite locations are only one factor that may be considered in generating an RTUC. Other factors may include predicted traffic loads along the cross-links between the nodes, available node resources, and planned node outages. All of these factors are used for exemplary purposes, and are not intended to limit the scope of the present invention. In a ground-based communication system, for example, different factors may be used in determining an RTUC.

Referring again to FIG. 7, after the step 202 of generating routing tables, step 203 of creating page maps is performed. Step 203 includes the steps of creating a PT-to-page map (e.g., PT-to-page map 10, FIG. 5) and an RN-to-page map (e.g., RN-to-page map 190, FIG. 6) for at least one neighboring node of the target node. As would be obvious to one of skill in the art based on the description, creation of both of these page maps are not essential to gain the advantages of the present invention. Either, both, or additional page maps may be created, depending on the particular communication system.

A PT-to-page map 180, as illustrated in FIG. 5, indicates to a node which routing page to use for a given packet type. In a preferred embodiment, the PT-to-page map is used to determine which routing page to use for non-mission data only. However, the method of the present invention could be easily adapted to use the PT-to-page map for mission data as well.

The determination of which routing page to allocate to the different packet types depends on the status of the system nodes (e.g., fully operational, under test). Using FIG. 3 for illustration, assume that a target node 100 is being newly integrated into the system. Before mission data is allowed to be sent to and routed by target node 100, the system may desire to test the operability of target node 100. Thus, the system may first want to send test packets through target node 100, while not allowing mission data packets to be sent through target node 100. When neighboring node 102 receives a test packet intended for target node 100, neighboring node 102 will correlate the test packet with its PT-to-page map 180 (FIG. 5), which indicates that a particular routing page (e.g., routing page 5) be used to route the test packet. Routing page 5 contains entries that direct the node to route data packets through target node 100.

Figure 8:
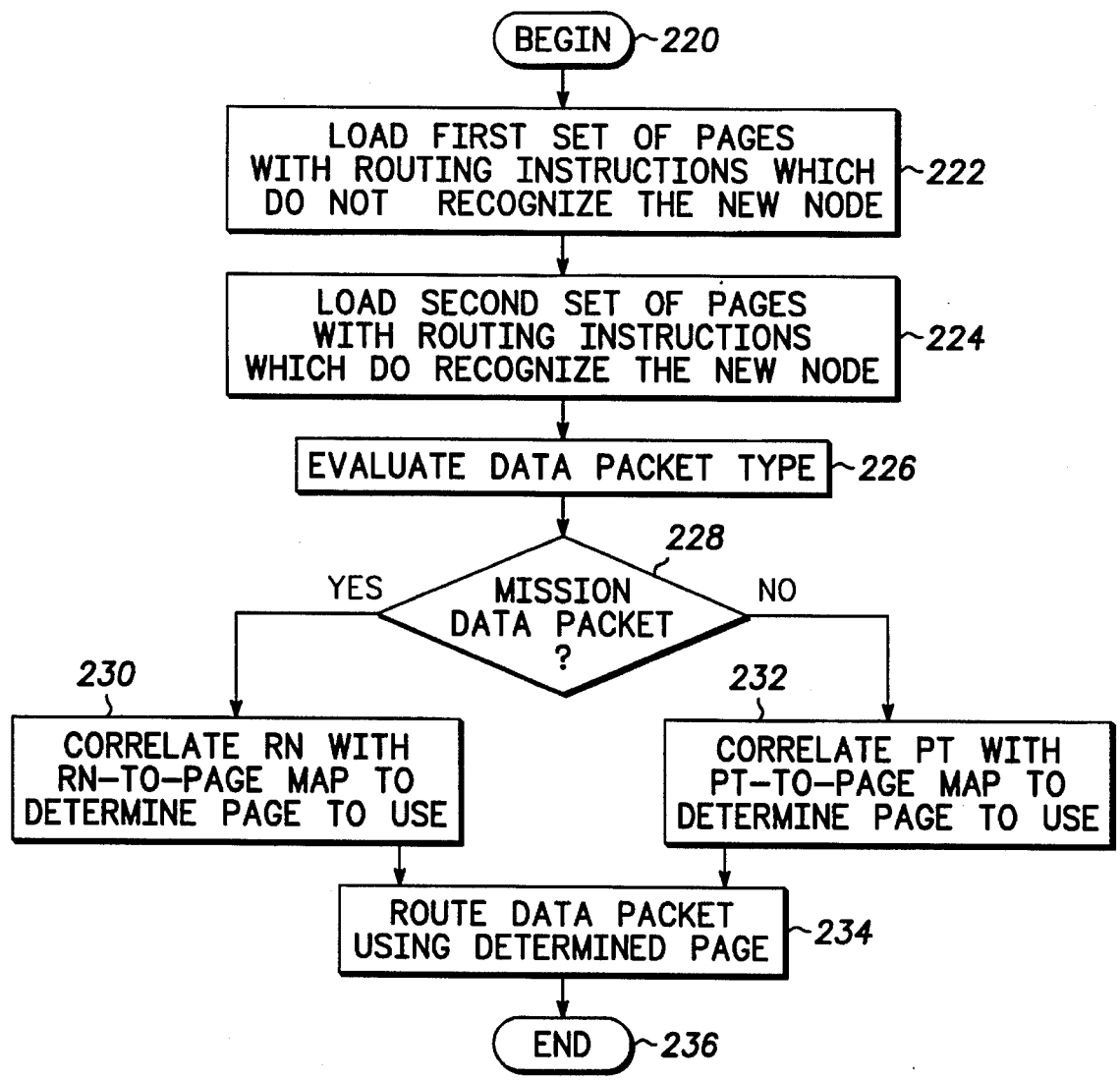
FIG. 8 illustrates a method for a neighboring communication node to route data packets to a selected node in accordance with a preferred embodiment of the present invention.

As described in conjunction with FIG. 8, when a neighboring node receives a mission data packet, the PT-to-page map 180 (FIG. 5) is not used. Instead, an RN-to-page map (e.g., RN-to-page map 190, FIG. 6) is used to determine how to route the mission data packet. An RN-to-page map 190, as illustrated in FIG. 6, indicates to a neighboring node which routing table page to use for a given RN within a received data packet. For illustration purposes, eight binary RN values (i.e., 000 through 111) are shown in FIG. 6.

Some of the routing pages are allocated among the possible RN values. Assume, for example, that a node has five available routing pages and eight possible RN values (e.g., binary values from 000 to 111). Assume also that routing pages 1–4 do not recognize the existence of target node 100 (FIG. 3) (i.e., those pages will not instruct the neighboring node to route a data packet to target node 100), and that routing page 5 does recognize target node 100. When target node 100 is under test, test packets destined for target node 100 would desirably be routed using routing page 5. However, mission data packets would desirably be routed using routing pages 1–4, thus avoiding target node 100. Thus, the RN-to-page map 190 (FIG. 6) would be generated such that one of routing pages 1–4 is used for any given RN, as illustrated in FIG. 6.

Referring again to FIG. 7, after the step 203 of generating page maps, the routing table pages and page maps are sent to the neighboring nodes in step 204. The information may be sent directly tom the control station to a neighboring node or may be routed through other nodes to the neighboring node. Additionally, the information may be sent in the form of RTUCs for pre-existing routing pages and page maps, or may be sent as entire tables and page maps.

At the times when the new tattles and page maps are to take effect, step 206 is performed of routing data packets according to new tables and page maps. Each node routes received data packets according to the new or updated routing tables and page maps corresponding to that node.

A determination is made in step 208 whether a time for new routing table pages (or updates to existing pages) and/or page maps has been reached. If system conditions indicate that such a time has been reached (e.g., the currently operating pages or maps will soon be obsolete or will produce inefficient routing), the process iterates as shown in FIG. 7. If such a time has not been reached in step 208, then the route data packets according to new tables and page maps step 206 continues to be performed as shown in FIG. 7, until such a time is reached.

FIG. 8 illustrates a method for a neighboring communication node to route data packets to a selected node in accordance with a preferred embodiment of the present invention. FIG. 3 will be used for illustrative purposes to describe the method shown in FIG. 8. Assume, for descriptive purposes, that the communication system is currently operating using only nodes 102–112 (FIG. 3). The system plans to incorporate node 100 (FIG. 3). Prior to incorporating the new node 100, the currently operating nodes 102–112 route data packets as if new node 100 does not exist. Thus, for example, the routing table pages of neighboring node 102 that are used for mission data will have no entries that will route a mission data packet to the right (i.e., to new node 100). The steps of FIG. 8 illustrate how the communication system smoothly incorporates node 100 on a limited basis. The steps illustrated in FIG. 8 are desirably carried out by the currently operating nodes 102–112.

The method begins in step 220 with the step 222 of loading a first routing page set with routing instructions which do not recognize existence of the new node 100. A routing page "set" may contain from one routing page to all the available routing pages. For example, in a system using eight routing pages, a set of routing pages may include pages 1–4 which contain entries as if the new node 100 did not exist. Loading of the first routing page set may be accomplished by using update commands, as described previously.

In step 224, a second routing page set is loaded with routing instructions which do recognize existence of the new node 100. This step 224 is performed in the same manner as step 222. The order in which steps 222 and 224 are carried out is not important. In a preferred embodiment, steps 222 and 224 are carried out together and continuously as update commands are executed. The update commands for the first routing instruction set and the second routing instruction set may be interleaved, for example. However, it would be obvious to one of skill in the art based on the description that steps 222 and 224 may be carried out separately (e.g., when an entire routing table is sent to the node).

In step 226, a data packet is received and evaluated to determine the data packet type. As described above, a data packet type may be, for example, mission data, test data, telemetry, or operations data.

A determination is made in step 228 whether the data packet type is mission data. If the data packet type is mission data, step 230 is performed which extracts the RN from the data packet and correlates the RN to the RN-to-page map (FIG. 6) to determine which routing page to use to route the data packet. If the data packet type is not mission data, step 232 is performed which correlates the data packet type with the PT-to-page map (FIG. 5) to determine which routing page to use to route the data packet. As would be obvious to one of skill in the art based on the description, the particular logic involved in correlating the PT and RN to the page maps may vary. For example, instead of first checking the data packet type in steps 226 and 228, the node may look at the RN first. The RN may hold some value (e.g., 000) which indicates that the data is not mission data. Depending on the RN value, either step 230 or step 232 may then be performed.

After the appropriate page has been determined in step 230 or 232 for routing of the received data packet, step 234 routes the received data packet accordingly. Step 234 correlates the DN-ID of the received data packet with the routing table page determined in step 230 or 232. Then, the node would route the data packet to the corresponding neighboring node. The method ends in step 236.

The method described in FIG. 8 may be used equally well to remove a node from the communication system as would be obvious to one of skill in the art based on the description. For example, assume all nodes 100–112 illustrated in FIG. 3 are currently operating and the system desires to remove node 100. The method of FIG. 8 may be easily modified to achieve such an objective.

Figure 9:
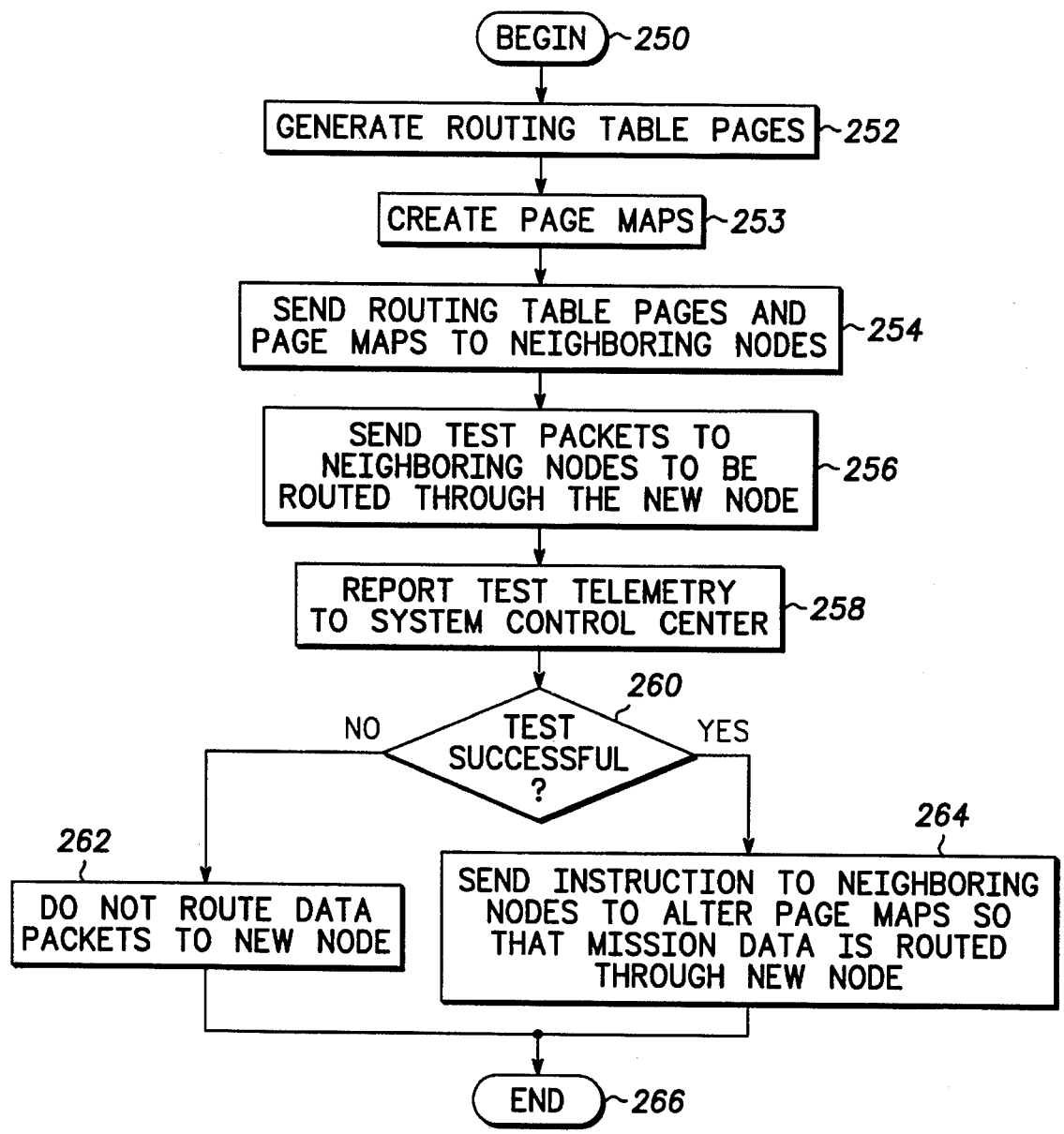
FIG. 9 illustrates a method for a system control center to test operability of a selected node in accordance with a preferred embodiment of the present invention.

FIG. 9 illustrates a method for a system control center to test operability of a selected node in accordance with a preferred embodiment of the present invention. Again, for purposes of description, FIG. 3 will be used. Assume that the communication system desires to test and incorporate new node 100 (FIG. 3). The steps of FIG. 9 illustrate how the communication system smoothly tests and fully incorporates new node 100.

The method begins in step 250 (FIG. 9) when the SCS 24 (FIG. 1) in step 252 generates routing table pages for at least the neighboring nodes 102–112 (FIG. 3) of new node 100. Next, in step 253, RN-to-page maps, and PT-to-page maps are created for at least the neighboring nodes 102–112 (FIG. 3) of new node 100. Generation of routing table pages and creation of page maps has been described in detail above.

In step 254, the routing table pages and page maps are sent to at least the neighboring nodes 102–112 either in the form of update commands, routing tables, or a combination thereof. The neighboring nodes 102–112 receive the routing table pages and page maps and update their routing table pages and page maps in accordance with the method described in FIG. 8. In a preferred embodiment, SCS 24 (FIG. 1) may send a "test initiation" message to the neighboring nodes 102–112 to indicate that the neighboring nodes 102–112 should begin operating in accordance with the new routing tables and page maps.

Next, in step 256 (FIG. 9), the SCS 24 (FIG. 1) generates and sends test packets to be routed through the new node 100. The purpose of the test packets is to ascertain whether new node 100 has the ability to receive and route data packets (i.e., to test whether new node 100 is operable). When a test packet is received by neighboring node 102, neighboring node 102 checks its PT-to-page map (FIG. 5) to see which routing page is used for test packets. The neighboring node 102 then sends the test packet to the new node 100 accordingly. Assuming the new node 100 receives the test packet, the new node 100 may or may not be required to further route the test packet. Eventually, the test packet will reach its desired destination if the new node 100 is capable of receiving and routing the test packet.

In step 258 (FIG. 9), telemetry data is sent to the SCS 24 (FIG. 1) by either the new node 100 or by another node that received the test packet after being routed through new node 100. The telemetry data indicates whether the test packet was correctly routed through the new node 100. In an alternate embodiment, the test packet may be returned to SCS 24 (FIG. 1) directly. If the test packet reaches SCS 24, then the test for that particular test packet may be presumed to be successful. SCS 24 desirably generates an adequate number of test packets so as to fully test the routing capability of the new node 100.

After the test packet is received by SCS 24 (FIG. 1), a determination is made in step 260 (FIG. 9) whether the test was successful. If the test was not successful, step 262 indicates that mission data packets should not be routed through the new node 100. If the test was successful, step 264 is performed.

In step 264, the SCS 24 (FIG. 1) sends instructions to all neighboring nodes 102–112 to alter their RN-to-page maps and/or their PT-to-page maps so that mission data may be routed through the new node 100. Desirably, the instructions will have a time of execution so that all neighboring nodes will execute the instructions simultaneously and thus will recognize existence of new node 100 at the same time.

Prior to step 264, neighboring nodes 102–112 had their KN-to-page maps configured such that mission data was routed only using pages that did not recognize existence of new node 100. After step 264, neighboring nodes 102–112 have their RN-to-page maps configured such that mission data is routed using pages that do recognize existence of new node 100. In other words, after receiving the instruction from SCS 24 (FIG. 1), neighboring nodes 102–112 switch from routing according to the first routing page set to routing according to the second routing page set.

Several advantages to the method of the present invention are apparent from the results of step 264. Recognition of the new node 100 by the neighboring nodes 102–112 (and, thus, by all other nodes of the communication system) is accomplished simply by sending a command to the neighboring nodes 102–112 to begin using the second set of routing table pages. This provides for rapid and synchronous incorporation of new node 100 while using a minimal amount of resources and time. For example, entire new tables that recognize new node 100 need not be sent to neighboring nodes 102–112, thus eliminating memory and synchronization difficulties with loading the new tables and beginning execution with the new tables.

In an alternate embodiment, rather than performing step 264 as described above, each node may have a "bias value" which offsets each RN. Prior to testing new node 100, the bias value would offset each RN to point into the RN-to-page map to a set of routing pages that does not recognize the existence of new node 100. Once new node 100 is verified to be operational, the bias value is changed to offset each RN to a set of routing pages that does recognize the existence of new node 100. The bias value may be changed using a message from the SCS 24 (FIG. 1) as in step 264.

For example, prior to operational verification of new node 100, the bias value may be zero. Thus, the offset of each RN would be zero and the first entries in the RN-to-page map would be used. After testing verification of new node 100, the bias value may be changed to four, for example. By adding the bias value to each RN, the RN-to-page map entries used would begin at the fifth entry. The set of routing table pages starting at the fifth entry would recognize the existence of new node 100.

An advantage to using a bias value as described is that only a single value needs to be changed to transition to a portion of the page map that recognizes new node 100, rather than changing multiple or all entries in the page map. Thus, the message from SCS 24 (FIG. 1) may be appreciable smaller in size to effect the change. As a result, system bandwidth is saved that may be used for other purposes.

In summary, a method and apparatus has been described for balancing traffic load throughout a system and for communicating in a discretionary manner with a particular node in a communication system based on the type of data being sent and/or the status of the node. The foregoing description of the specific embodiments will so fully reveal the general nature of the invention that others can, by applying current knowledge, readily modify or adapt for various applications such specific embodiments without departing from the generic concept and, therefore, such adaptations and modifications should and are intended to be comprehended within the meaning and range of equivalents of the disclosed embodiments. In particular, while a preferred embodiment has been described in terms of a satellite communication system, the method and apparatus of the present invention may be utilized for any type of communication system having multiple nodes that utilize communication links between them.

It is to be understood that the phraseology or terminology employed herein is for the purpose of description and not of limitation. Accordingly, the invention is intended to embrace all such alternatives, modifications, equivalents and variations as fall within the spirit and broad scope of the appended claims.

What is claimed is:

1. A method for routing a data packet through a communication system comprising a selected node and neighboring nodes that communicate directly with the selected node, wherein the data packet has a packet destination variable that specifies an intended destination of the data packet, the method comprising the steps of:

a) generating, for a neighboring node, routing instructions comprising a first set of the routing instructions and a second set of the routing instructions, the first set having routing directions for assigned destination identifiers recognized by the communication system, wherein no routing direction of the first set instructs the neighboring node to route the data packet in a direction of the selected node, and the second set having the routing directions for the assigned destination identifiers, wherein at least one of the routing directions of the second set instructs the neighboring node to route the data packet in the direction of the selected node;

b) sending the routing instructions to the neighboring node;

c) receiving the data packet by the neighboring node, the data packet having a routing number and the packet destination variable, the routing number for determining which routing instruction of the first set or the second set to use, and the packet destination variable for correlating with the assigned destination identifiers in the first set and the second set;

d) evaluating the routing number to determine whether the data packet should be routed according to the first set or the second set;

e) if the data packet should be routed according to the first set, correlating the packet destination variable with the assigned destination identifiers of the first set to determine in which of the routing directions to route the data packet;

f) if the data packet should be routed according to the second set, correlating the packet destination variable with the assigned destination identifiers of the second set to determine in which of the routing directions to route the data packet; and g) routing the data packet according to a direction determined in steps e) and f).

2. The method as claimed in claim 1, wherein the data packet may take at least one alternative path through the communication system, and the step a) of generating the routing instructions comprises the steps of:

a1) generating the first set to include at least one first page of routing instructions, wherein a first page corresponds to an alternative path for the data packet and none of the at least one of the routing instructions of the at least one first page instructs the neighboring node to route the data packet in the direction of the selected node; and a2) generating the second set to include at least one second page of routing instructions, wherein at least one of the routing instructions of the at least one second page instructs the neighboring node to route the data packet in the direction of the selected node.

3. The method as claimed in claim 2, further comprising the steps of:

h) creating a data structure that correlates possible routing numbers to one of the at least one first page or the at least one second page;

i) sending the data structure to the neighboring node; and wherein the step d) of evaluating the routing number comprises the step of correlating the routing number to the data structure to determine which of the at least one first page or the at least one second page corresponds to the routing number.

4. The method as claimed in claim 3, further comprising the steps of:

j) sending a message to the neighboring node to alter the data structure so that at least one of the possible routing numbers correlates to a different one of the at least one first page or the at least one second page; and k) altering the data structure according to the message.

5. The method as claimed in claim 3, further comprising the steps of:

j) creating a bias value which is used to offset the routing number by an index into the data structure;

k) sending a first message to the neighboring node that includes the bias value;

wherein step e) comprises the step of adding the bias value to the routing number prior to correlating the routing number; and wherein step f) comprises the step of adding the bias value to the routing number prior to correlating the routing number.

6. The method as claimed in claim 1, further comprising the steps of:

h) creating an update message that has a time of execution and a new routing instruction that corresponds to an old routing instruction in the first set or the second set;

i) sending the update message to the neighboring node; and j) at the time of execution, replacing the old routing instruction with the new routing instruction.

7. A method for routing a data packet through a communication system comprising a selected node and neighboring nodes that communicate directly with the selected node, wherein the data packet has a packet destination variable that specifies an intended destination of the data packet, the method comprising the steps of:

a) generating, for a neighboring node, routing instructions comprising a first set of the routing instructions and a second set of the routing instructions, the first set having routing directions for assigned destination identifiers recognized by the communication system, wherein no routing direction of the first set instructs the neighboring node to route the data packet in a direction of the selected node, and the second set having the routing directions for the assigned destination identifiers, wherein at least one of the routing directions of the second set instructs the neighboring node to route the data packet in the direction of the selected node;

b) sending the routing instructions to the neighboring node;

c) receiving the data packet, the data packet having a type and the packet destination variable, the type for determining which routing instruction of the first set or the second set to use, and the packet destination variable for correlating with the assigned destination identifiers in the first set and the second set;

d) evaluating the type to determine whether the data packet should be routed to the selected node according to the first set or the second set;

e) if the data packet should be routed according to the first set, correlating the packet destination variable with the assigned destination identifiers of the first set to determine in which of the routing directions to route the data packet;

f) if the data packet should be routed according to the second set, correlating the packet destination variable with the assigned destination identifiers of the second set to determine in which of the routing directions to route the data packet; and g) routing the data packet according to a direction determined in steps e) and f).

8. The method as claimed in claim 7, wherein a number of possible data packet types exist within the communication system and the step a) of generating the routing instructions comprises the step of:

a1) generating the first set to include at least one first page of routing instructions, wherein a first page corresponds to a first type of the data packet and none of the at least one of the routing instructions of the at least one first page instructs the neighboring node to route the data packet in the direction of the selected node; and a2) generating the second set to include at least one second page of routing instructions, wherein a second page corresponds to a second type of the data packet and at least one of the routing instructions of the at least one second page instructs the neighboring node to route the data packet in the direction of the selected node.

9. The method as claimed in claim 8, further comprising the steps of:

h) creating a data structure that maps the possible data packet types to one of the at least one first page or to the at least one second page;

i) sending the data structure to the neighboring node; and wherein the step d) of evaluating the type comprises the step of correlating the type to the data structure to determine which of the at least one first page or the at least one second page corresponds to the type.

10. The method as claimed in claim 9, wherein at least one additional data packet type is possible within the communication system, the method further comprising the step of:

a3) generating at least one additional set of routing instructions that includes at least one additional page of the routing instructions, an additional page corresponding to an additional data packet type;

wherein step h) comprises the step of creating the data structure that maps the at least one additional data packet type to the at least one additional page; and wherein step d) of evaluating the type comprises the step of correlating the type to the data structure to determine which of the at least one first page, the at least one second page, or the at least one additional page corresponds to the type.

11. The method as claimed in claim 9, further comprising the steps of:

j) sending a message to the neighboring node to alter the data structure so that at least one of the possible data packet types correlates to a different one of the at least one first page or the at least one second page; and k) altering the data structure according to the message.

12. The method as claimed in claim 8, wherein the communication system further comprises multiple communication units which send and receive mission type data and the step d) of evaluating the type comprises the steps of:
   d1) evaluating the type to determine whether the data packet contains the mission type data that originates from a communication unit;
   d2) where the type indicates that the data packet contains the mission type data, determining from a routing number included in the data packet which of the at least one first page or the at least one second page to use to route the data packet, wherein the routing number is for determining which routing instruction of the first set or the second set to use; and
   d3) where the type indicates that the data packet does not contain mission type data, not evaluating the routing number.

13. The method as claimed in claim 12, wherein the step d2) of determining comprises the step of correlating the routing number with a second data structure that maps possible values of the routing number to the at least one first page or the at least one second page.

14. A method for routing a data packet through a communication system comprising a selected node and neighboring nodes that communicate directly with the selected node, wherein the data packet has a packet destination variable that specifies an intended destination of the data packet, the method comprising the steps of:
   a) generating, for a neighboring node, routing instructions comprising a first set of the routing instructions and a second set of the routing instructions, the first set having routing directions for assigned destination identifiers recognized by the communication system, wherein no routing direction of the first set instructs the neighboring node to route the data packet in a direction of the selected node, and the second set having the routing directions for the assigned destination identifiers, wherein at least one of the routing directions of the second set instructs the neighboring node to route the data packet in the direction of the selected node;
   b) receiving the data packet, the data packet having a routing number and the packet destination variable, the routing number for determining which routing instruction of the first set or the second set to use, and the packet destination variable for correlating with the assigned destination identifiers in the first set and the second set;
   c) evaluating the routing number to determine whether the data packet should be routed according to the first set or the second set;
   d) if the data packet should be routed according to the first set, correlating the packet destination variable with the assigned destination identifiers of the first set to determine in which of the routing directions to route the data packet;
   e) if the data packet should be routed according to the second set, correlating the packet destination variable with the assigned destination identifiers of the second set to determine in which of the routing directions to route the data packet; and
   f) routing the data packet according to a direction determined in steps d) and e).

15. A method for routing a data packet through a communication system comprising a selected node and neighboring nodes that communicate directly with the selected node, wherein the data packet has a packet destination variable that specifies an intended destination of the data packet, the method comprising the steps of:
   a) receiving, by a neighboring node, routing instructions comprising a first set of the routing instructions and a second set of the routing instructions, the fast set having routing directions for assigned destination identifiers recognized by the communication system, wherein no routing direction of the first set instructs the neighboring node to route the data packet in a direction of the selected node, and the second set having the routing directions for the assigned destination identifiers, wherein at least one of the routing directions of the second set instructs the neighboring node to route the data packet in the direction of the selected node;
   b) receiving the data packet, the data packet having a type and the packet destination variable, the type for determining which routing instruction of the first set or the second set to use, and the packet destination variable for correlating with the assigned destination identifiers in the first set and the second set;
   c) evaluating the type to determine whether the data packet should be routed to the selected node according to the first set or the second set;
   d) if the data packet should be routed according to the first set, correlating the packet destination variable with the assigned destination identifiers of the first set to determine in which of the routing directions to route the data packet;
   e) if the data packet should be routed according to the second set, correlating the packet destination variable with the assigned destination identifiers of the second set to determine in which of the routing directions to route the data packet; and
   f) routing the data packet according to a direction determined in steps d) and e).

16. A method for testing operability of a selected node in a communication system, wherein the communication system comprises a system control facility and multiple nodes which communicate through communication links, and neighboring nodes support the communication links with the selected node, the method comprising the steps of:
   a) generating, for a neighboring node, routing instructions comprising a first set of the routing instructions and a second set of the routing instructions, the first set having routing directions for assigned destination identifiers recognized by the communication system, wherein no routing direction of the first set instructs the neighboring node to route a data packet in a direction of the selected node, and the second set having the routing directions for the assigned destination identifiers, wherein at least one of the routing directions of the second set instructs the neighboring node to route the data packet in the direction of the selected node;
   b) sending the routing instructions to the neighboring node;
   c) creating at least one test packet for testing operability of the selected node;
   d) sending the at least one test packet to the neighboring node;
   e) routing the at least one test packet by correlating a packet destination variable contained within the at least one test packet with the assigned destination identifiers in the second set to determine a direction of routing;
   f) evaluating telemetry data that indicates whether routing the at least one test packet through the selected node was successful; and g) where routing the at least one test packet was successful, sending an instruction to the neighboring node to route future data packets by correlating the packet destination variable contained within the future data packets with the assigned destination identifiers in the second set to determine the direction of routing.

17. The method as claimed in claim 16, further comprising the step of sending a test initiation message to the neighboring node to route the at least one test packet according to the second set, and to route other types of data packets according to the first set.

18. The method as claimed in claim 17, wherein the step a) of generating the routing instructions comprises the steps of:
- a1) generating the first set to include at least one first page of routing instructions, wherein a first page corresponds to a non-test type of the data packet and none of the routing instructions of the at least one first page instruct the neighboring node to route the data packet in the direction of the selected node; and
- a2) generating the second set of routing instructions to include at least one second page of routing instructions, wherein a second page corresponds to a test type of the data packet and at least one of the routing instructions of the at least one second page instructs the neighboring node to route the data packet in the direction of the selected node.

19. A communication system comprising:
- a system control facility for generating and sending routing instructions to a neighboring node, the routing instructions comprising a first set of the routing instructions and a second set of the routing instructions, the first set having routing directions for assigned destination identifiers recognized by the communication system, wherein none of the routing directions of the first set instruct the neighboring node to route a data packet in a direction of a selected node, and the second set having the routing directions for the assigned destination identifiers, wherein at least one of the routing directions instructs the neighboring node to route the data packet in the direction of the selected node; and
- multiple nodes in communication proximity to the system control facility, the multiple nodes comprising the selected node and neighboring nodes that directly communicate with the selected node, the neighboring nodes for receiving the routing instructions, receiving the data packet, the data packet having a type and a packet destination variable, the type for determining which routing instruction of the first set or the second set to use, and the packet destination variable for correlating with the assigned destination identifiers in the first set and the second set, evaluating the type to determine whether the data packet should be routed to the selected node according to the first set or the second set, if the data packet should be routed according to the first set, correlating the packet destination variable with the assigned destination identifiers of the first set to determine in which of the routing directions to route the data packet, if the data packet should be routed according to the second set, correlating the packet destination variable with the assigned destination identifiers of the second set to determine in which of the routing directions to route the data packet, and sending the data packet according to a direction so determined.

20. A communication node in a communication system having a system control facility and neighboring nodes that support communication links with the communication node, the communication node comprising:
- at least one down-link receiver for receiving routing instructions, the routing instructions comprising a first t of the routing instructions and a second set of the routing instructions, the first set having routing directions for assigned destination identifiers recognized by the communication system, wherein none of the routing directions of the first set instruct the communication node to route a data packet in a direction of a selected node, and the second set having the routing directions for the assigned destination identifiers, wherein at least one of the routing directions of the second set instructs the communication node to route the data packet in the direction of the selected node;
- at least one data packet receiver for receiving the data packet, the data packet having a type and a packet destination variable, the type for determining which routing instruction of the first set or the second set to use, and the packet destination variable for correlating with the assigned destination identifiers in the first set and the second set;
- a node controller coupled to the at least one down-link receiver and the at least one data packet receiver, the node controller for evaluating the type to determine whether the data packet should be routed to the selected node according to the first set or the second set, if the data packet should be routed according to the first set, correlating the packet destination variable with the assigned destination identifiers of the first set to determine in which of the routing directions to route the data packet, if the data packet should be routed according to the second set, correlating the packet destination variable with the assigned destination identifiers of the second set to determine in which of the routing directions to route the data packet; and
- at least one data packet transmitter coupled to the node controller, the at least one data packet transmitter for sending the data packet according to a direction determined by the node controller.

* * * * *